United States Patent [19]
Ida et al.

[11] Patent Number: 5,835,273
[45] Date of Patent: Nov. 10, 1998

[54] HIGH REFLECTIVITY, BROAD BAND MIRROR AND PROCESS FOR PRODUCING SUCH A MIRROR

[75] Inventors: Michel Ida, Voreppe; Patrick Chaton, Tencin, both of France

[73] Assignees: Commissariat a l'Energie Atomique, Paris; Etat Francais (représenté par le Délégué Général pour l'Armement, Armees, both of France

[21] Appl. No.: 433,963

[22] Filed: May 4, 1995

[51] Int. Cl.$^6$ ......................................................... G02B 5/18
[52] U.S. Cl. ......................... 359/584; 359/585; 359/590; 359/900
[58] Field of Search ...................................... 359/359, 360, 359/585, 586, 590, 900, 584; 372/99; 427/162, 167

[56] References Cited

U.S. PATENT DOCUMENTS

| | | | |
|---|---|---|---|
| H1572 | 8/1996 | Hood ........................................ | 359/584 |
| 4,826,267 | 5/1989 | Hall et al. ................................ | 359/586 |
| 4,856,019 | 8/1989 | Miyata et al. ........................... | 359/585 |
| 4,925,259 | 5/1990 | Emmett .................................... | 359/359 |
| 4,934,788 | 6/1990 | Southwell . | |
| 5,004,308 | 4/1991 | Hall et al. ................................ | 359/359 |
| 5,082,337 | 1/1992 | Chern et al. ............................. | 359/359 |
| 5,258,872 | 11/1993 | Johnson et al. ......................... | 359/589 |
| 5,475,531 | 12/1995 | Rahmlow et al. ...................... | 359/586 |

FOREIGN PATENT DOCUMENTS

| | | | |
|---|---|---|---|
| 0 265 912 | 5/1988 | European Pat. Off. .......... | G02B 5/08 |
| 0 280 299 | 8/1988 | European Pat. Off. .......... | G02B 5/08 |
| 0 372 438 | 6/1990 | European Pat. Off. .......... | G02B 5/08 |
| WO 85/01115 | 3/1985 | WIPO .............................. | G02B 5/18 |
| WO 90/02964 | 3/1990 | WIPO .............................. | G02B 5/28 |

OTHER PUBLICATIONS

Applied Optics, vol. 28, No. 14, pp. 2940–2944, Jul. 15, 1989, Edward P. Donovan, et al., "Near Infared Rugate Filter Fabrication by Ion Beam Assisted Deposition of Si(1–x)Nx Films".

Journal Of Vacuum Science And Technology, vol. 7, No. 3, pp. 2280–2285, May/Jun. 1989, G.A. Al–Jumaily, et al., "Ion Assisted Deposition of Oxynitrides of Aluminum and Silicon".

Applied Optics, vol. 28, No. 14, pp. 2800–2805, Jul. 15, 1989, B.J. Pond, et al., "Stress Reduction in Ion Beam Sputtered Mixed Oxide Films".

Journal of Applied Physics, vol. 66, No. 4, pp. 1805–1809, Aug. 15, 1989, R.P. Netterfield, et al., "Ion–Assisted Deposition of Mixed TIO2–SIO2 Films".

SPIE, vol. 1270, pp. 211–215 and 217–220, Mar. 12–13, 1990, Karl H. Guenther, "Recent Progress in Optical Coating Technology: Low Voltage Ion Plating Deposition".

Applied Optics, vol. 18, No. 17, pp. 2979–2989, Sep. 1, 1979, M. Ledger, "Inhomogenous Interface Laser Mirror Coatings".

These, pp. 18–25, Nov. 23, 1988, Luc Nouvelot, "Calcul Recurrent sur les Coefficients de Reflexion et Transmission", Universite Joseph Fourier, Grenoble.

*Primary Examiner*—Paul M. Dzierzynski
*Assistant Examiner*—John Juba, Jr.
*Attorney, Agent, or Firm*—Oblon, Spivak, McClelland, Maier & Neustadt, P.C.

[57] ABSTRACT

A high reflectivity, broad band mirror for a high flux laser and a process for producing such a mirror. The mirror includes a substrate on which is formed a metallic layer such as aluminum. A stack of layers are formed on the metallic layer. The stack includes alternating layers of two materials with the refractive index of one material being higher than that of the other. A surface layer of a third material is placed on the stack. The surface layer has a refractive index which varies in accordance with the continuous periodic profile. The mirror is formed by depositing the metallic layer on a substrate and forming the stack by an ion beam sputtering method.

1 Claim, 4 Drawing Sheets

HIGH REFLECTIVITY, BROAD BAND MIRROR AND PROCESS FOR PRODUCING SUCH A MIRROR

TECHNICAL FIELD

The present invention relates to a high reflectivity, broad band mirror. It more particularly relates to mirrors usable both in normal incidence and oblique incidence with angles exceeding 45°.

As a function of their spectral range, these mirrors are e.g. used as broad band mirrors for tunable lasers. They can also be used in high flux lasers or in devices having several wavelengths.

PRIOR ART

The problem which the present invention aims to solve is that of obtaining a mirror having both an extensive reflection band, a good reflectivity and a good resistance to the luminous flux.

The term "reflection band" of a mirror is understood to mean the width of the wavelength or frequency spectrum for which the reflectivity, i.e. the ratio between the intensity of the reflected flux and the intensity of the incident flux exceeds a given value.

A good reflectivity is obtained in known manner by stacking an alternation of layers of dielectric materials having high and low refractive indices $n_1$ and $n_2$ with $n_2 > n_1$ and having an optical thickness equal to quarter the central wavelength of the band of the mirror. Such a stack is commonly referred to as a Bragg mirror. It is preferably produced on a transparent substrate.

Document (1) relates to different types of mirrors and in particular those formed by an alternating stack of layers. Like all the documents referred to in the present text, it is listed at the end of the description. According to this document, the reflectivity R for a Bragg mirror is expressed as follows:

$$R = \left[\frac{1 - \left(\frac{n_s}{n_a}\right)\left(\frac{n_2}{n_1}\right)^{2N}}{1 + \left(\frac{n_s}{n_a}\right)\left(\frac{n_2}{n_1}\right)^{2N}}\right]^2$$

in which $n_a$ is the refractive index of air and N the number of pairs of high and low index layers ($n_1, n_2$).

The width of the band $\Delta\lambda$ of such a mirror is expressed as follows:

$$\Delta\lambda = \lambda_c \cdot \frac{2}{\pi} \cdot \frac{\Delta n}{<n>}$$

in which $\lambda_c$ is the central wavelength, $\Delta_n$ the difference $n_2 - n_1$ of the indices and $<n>$ the mean index between the two materials.

It would appear that the width of the band is essentially linked with the difference between the high index and the low index.

The most widely used materials for such mirrors are silicon dioxide ($SiO_2$), titanium dioxide ($TiO_2$), hafnium dioxide ($HfO_2$) and zirconium dioxide ($ZrO_2$), $SiO_2$ being used as the low index material. Among these materials, $TiO_2$ has the highest refractive index (n=2.45) and is therefore used together with $SiO_2$ for producing broad band mirrors.

Unfortunately, as is explained in document (2), the mirrors produced with the pair of materials $TiO_2$ and $SiO_2$ do not have a very good resistance to the laser flux compared with mirrors produced with the pairs $HfO_2$—$SiO_2$ or $ZrO_2$—$Sio_2$, so that $TiO_2$ is eliminated.

It would appear difficult to reconcile the broad band, high reflectivity conditions with a satisfactory resistance to intense laser fluxes.

One solution to the problem referred on p 175 ff of document (3) consists of stacking two Bragg mirrors, the mirrors being centered on two displaced wavelengths $\lambda_1$ and $\lambda_2$, which are chosen sufficiently close together as not to introduce any significant discontinuity into the reflection band of the resulting mirror. This band is to some extent the sum of the reflection bands of the two individual mirrors. The reflection bands of the individual mirrors can consequently be slightly less wide, which makes it possible to use pairs of materials having a smaller index difference, but a better resistance to the flux.

However, such a mirror is not completely satisfactory. Apart from the reduced reflectivity problems in the overlap part of the spectral bands of the two Bragg mirrors, such a structure fails as a result of the technological difficulty of its production. Thus, the stack of two mirrors leads to an increase in the thickness of the structure. The stack, which can be more than 5 µm for a mirror with a reflectivity exceeding 99.5%, is very fragile. Moreover, internal mechanical stresses further increase the risk of the structure being destroyed. In view of the restricted choice of materials for producing such stacks, it is difficult to also meet the mechanical strength requirements. The manufacturing output and efficiency are reduced and the cost of such double mirrors becomes excessive.

Moreover and as mentioned hereinbefore, the stack of two Bragg mirrors to some extent forms a Fabry-Perot cavity, which generates a high transmission peak in the spectral band, particularly for wavelengths at the intersection of the reflection bands of the individual mirrors. Finally, a double mirror structure does not constitute a satisfactory solution.

A further possibility for obtaining a broad band mirror and which is also referred to in document (3) consists of producing a stack, whereof each layer has an optical thickness equal to $\delta 4 + \delta\lambda$, in which $\lambda_0$ is the centering wavelength of the band of the mirror and $\delta\lambda$ a variation around $\lambda_0$ calculated for each layer.

Such a mirror is difficult and expensive to manufacture, particularly due to the need to determine $\delta\lambda$ for each layer, the need for a very precise check on the thickness of the layers and due to the large number of layers indispensable for obtaining an appropriate reflectivity over the entire spectral band of the mirror.

Finally, it would appear very difficult to obtain mirrors appropriate e.g. for intense flux, tunable lasers at a reasonable production price.

One object of the present invention is to supply a mirror having a high reflectivity, wide pass band and good resistance to the laser luminous flux which does not suffer from the disadvantages of the prior art mirrors referred to hereinbefore.

Another object is to propose a process for producing such a mirror.

DESCRIPTION OF THE INVENTION

The mirror according to the invention combines a mirror constituted by discreet alternating layers of index $n_1$ and $n_2$ and a layer having a continuously variable index.

To this end, the mirror according to the invention has a substrate, a stack placed on the substrate and formed by an alternation of layers of a first material having a first refractive index and layers of a second material having a second refractive index higher than the first refractive index, and a layer of a third material placed on the stack, said layer having a refractive index varying according to a continuous profile. The layer of the third material consequently has no "index jumps" from one value to another like the stack.

By adapting the index profile of said layer to the use conditions of the mirror, it is possible not only to increase the reflection band and reflectivity of the mirror, but also reduce to a significant extent the electric field of the luminous flux penetrating the stack of discreet layers. According to an aspect of the invention, the profile of the index is chosen in periodic, e.g. sinusoidal form. The calculation of the refractive index profile is e.g. obtained with a so-called entropy minimization, annealing algorithm in accordance with document (4).

In this algorithm, the function Ci represents the variation between the calculated optical properties and the sought optical properties for a given configuration i of parameters, ΔCi being a variation of said function after an elementary disturbance.

After each disturbance, the optical properties can be calculated by a matrix model for isotropic, homogeneous layers having a plane-parallel face. The principle of this calculation is described in detail e.g. in document (1).

For this calculation, the continuous index variation layer is broken down into discreet layers. For example, a sinusoid period can be broken down into 30 elementary layers with which are associated characteristic matrixes. The product of these matrixes and matrixes associated with the Bragg mirror formed by the stack gives the optical properties of the complete structure. Reference should be made to document (5) for these calculations.

Thus, the variable index layer not only makes it possible to widen the spectral band of the mirror and increase its reflectivity, but also protect the stack against excessive electric fields.

The stack is preferably produced with the pair of materials $SiO_2$—$TiO_2$, which is chosen because it makes it possible to obtain mirrors having greater spectral band widths than those of mirrors produced with other pairs of materials. The stack can constitute a Bragg mirror.

In this case, the thickness of each of the layers of the stack is equal to $\lambda o/4$, in which $\lambda o$ is the centering wavelength of the mirror. As a result of the variable index layer, said stack is subject to a more moderate flux than the incident flux.

According to an interesting variant, the mirror also has a metallic layer between the substrate and the stack. This metallic layer makes it possible to increase the reflectivity of the mirror and consequently reduce the number of layers of the stack. Aluminum is an example of a metal which is suitable due to its high reflectivity and broad spectral reflection band.

Advantageously, the substrate is made from silica, quartz, glass or ceramic. The choice of the substrate can have an influence on the sought spectral response. However, in the case where a metallic layer is provided for increasing the reflectivity of the mirror, the substrate will be chosen as a function of other properties, such as its thermal conduction.

In order to produce a mirror according to the invention, use is advantageously made of a process involving the following stages:

a) deposition of a metallic layer on a substrate, b) formation on said metallic layer of an alternating stack of layers of a first and a second materials respectively having a first refractive index and a second refractive index higher than the first refractive index, c) formation on the stack of a layer of a third material having a refractive index varying in accordance with a continuous profile.

The alternating stack is e.g. produced by ion beam sputtering (IBS). This deposition method is very advantageous for depositing dielectrics as a result of its energy character. It makes it possible to obtain dense materials with a high optical index of great interest within the scope of the present application. One illustration thereof is given in document (6).

For the variable index layer for which a very precise control of the deposit is required, use is preferably made of dual ion beam sputtering (DIBS). An example of the DIBS method is illustrated by the S. J. Holmes publication in document (7).

This method, which uses a silicon target in a reactive atmosphere of oxygen and nitrogen, makes it possible to finely control the production of a silicon oxynitride deposit, whose index profile can be continuously adjusted by modifying the partial oxygen pressure with respect to the partial nitrogen pressure.

DETAILED DESCRIPTION OF AN EMBODIMENT

Figure 1:
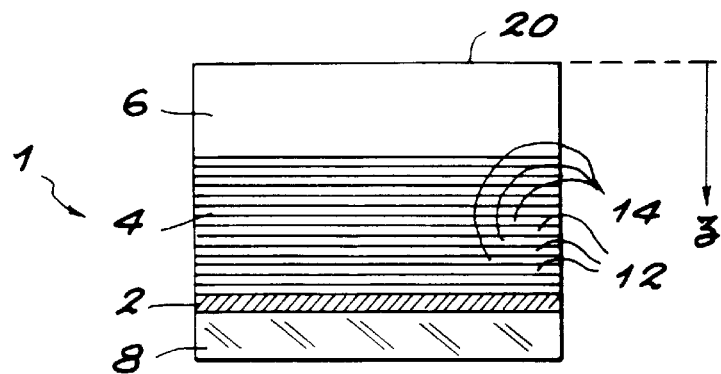
FIG. 1 is a diagrammatic section of a mirror according to the invention.

The structure of the mirror 1 shown in FIG. 1 has a metallic layer 2, an alternating stack 4, e.g. a Bragg mirror, and a variable index layer 6, stacked in said order on a substrate 8. In the exemplified embodiment described, the mirror 1 is centered on a wavelength $\lambda_0=652$ nm and has a spectral band width $\Delta\lambda=145$ nm with a reflectivity $R \geq 99.7\%$ for a flux arriving at 45° in P polarization or bias.

In this embodiment the substrate has no optical function, to the extent that it is covered by the metallic layer 2. The substrate is e.g. made from silicon.

For the layer 2 it is possible to choose metals such as aluminum or silver, which have the advantage of a good reflectivity in the visible and infrared spectrum and an extensive spectral band. However, aluminum is preferred to silver because its deterioration in contact with air is slower. This layer is deposited e.g. by a standard vacuum deposition method.

The stack 4 is preferably produced by ion beam sputtering. In the present embodiment, the stack 4 is a Bragg mirror having seven pairs of alternating layers. Each pair of layers is formed by a $TiO_2$ layer 12 of refractive index $n_2=2.4$ and having a thickness of 68 nm and a $SiO_2$ layer 14 of refractive index $n_1=1.48$ and thickness 110 nm.

The variable index layer 6 is produced by the DIBS method. In the present embodiment, the sinusoidal index profile is optimized for the particularly difficult condition of a P polarization at incidence 45° ($\pi/4$ radians).

The silicon oxynitride layer 6 has a refractive index centered on <n>=1.8 and varying with an amplitude Δn=±0.3 according to a period p=205 nm and with an initial phase φ=4 radians.

The index n varies in a direction perpendicular to the layer 6 and as a function of a thickness z measured from the mirror surface 20.

The value of the index as a function of z is given by the formula:

$$n(z) = <n> + \Delta n \cdot \sin\left(\frac{2\pi}{p} z + \phi\right)$$

Figure 2:
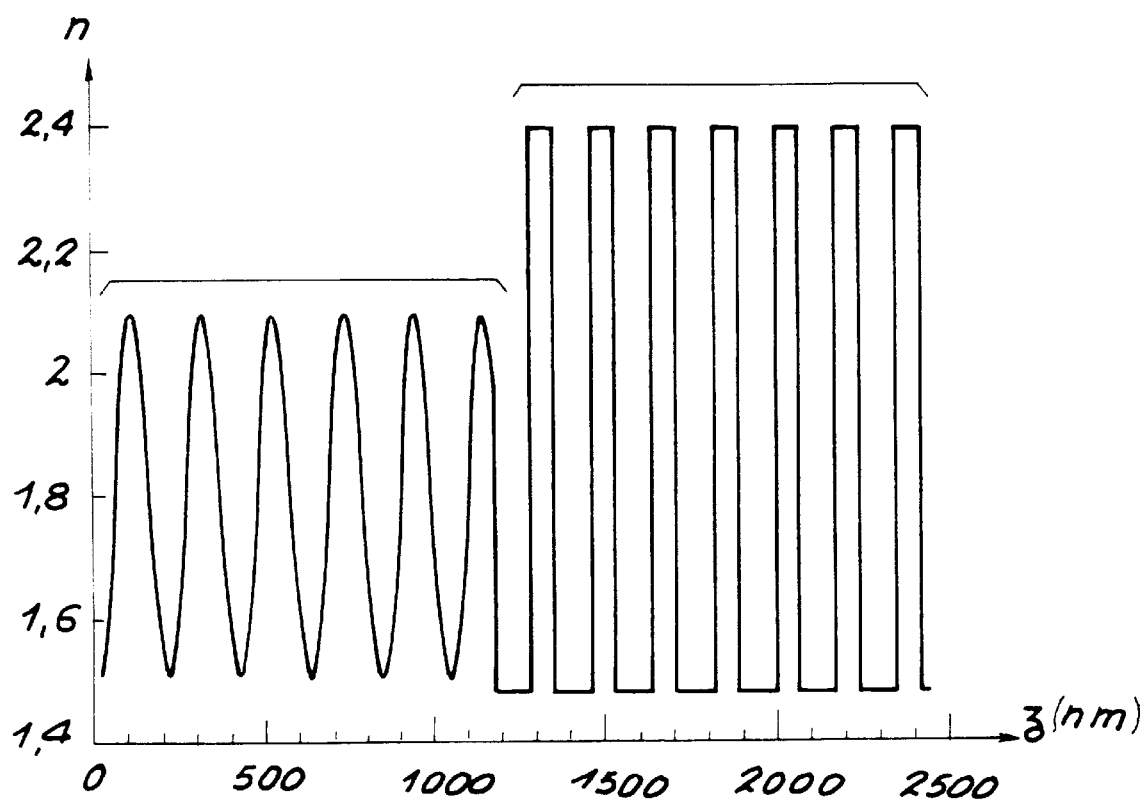
FIG. 2 shows the index profile of a variable index layer and an alternating stack according to an aspect of the invention.

FIG. 2 illustrates the index profile of the mirror. The index, plotted on the ordinate, is expressed as a function of the thickness z measured from the surface 10 and plotted on the abscissa, being expressed in nanometers.

The refractive index of the layer 6 varies sinusoidally between 1.5 and 2.1 with a period of 205 nm. The Bragg mirror has discontinuous index values corresponding to n=1.45 for $SiO_2$ and $n_2$ =2.4 for $TiO_2$.

Figure 3:
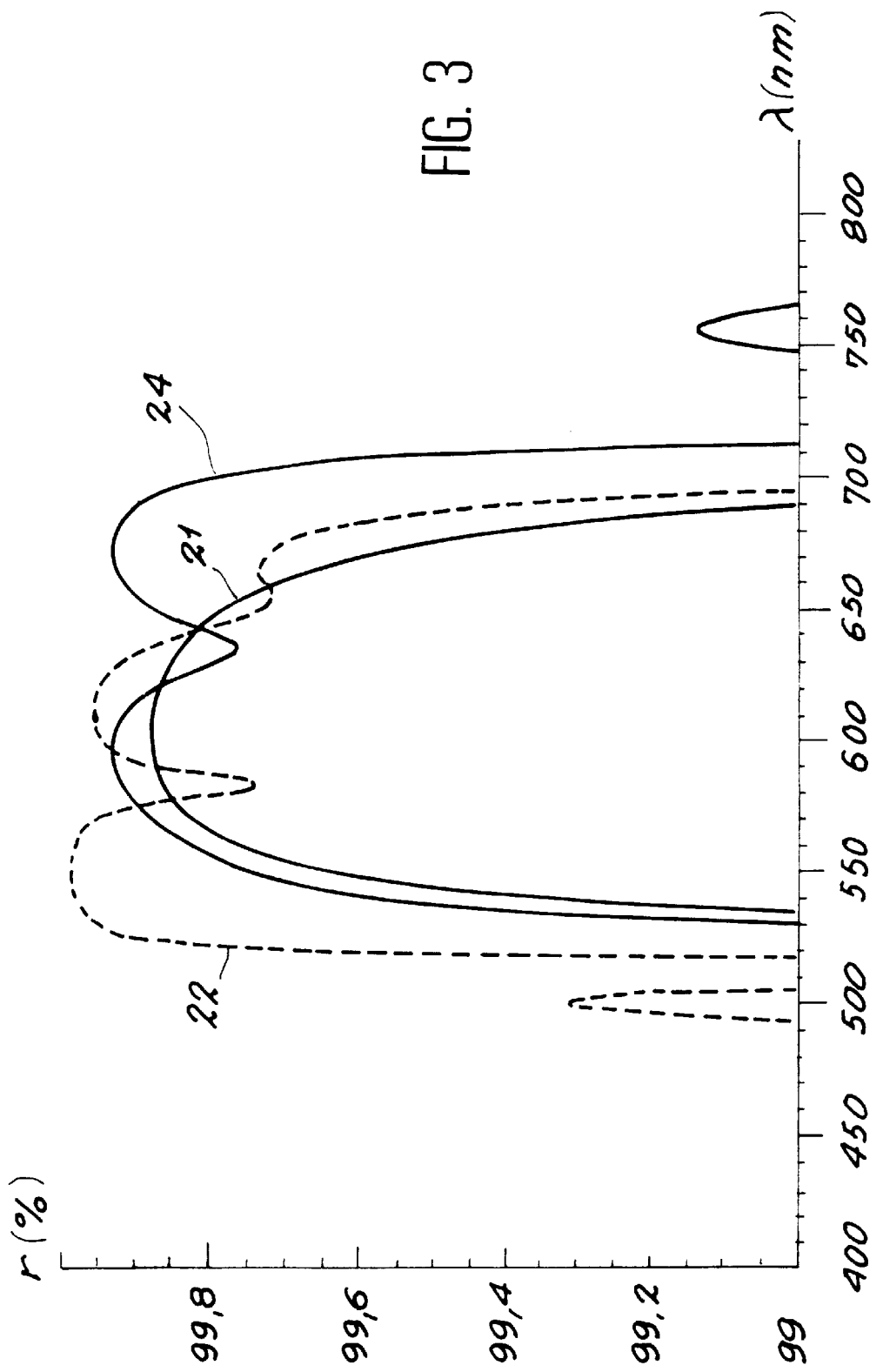
FIG. 3 graphically shows the spectral band of a known mirror and mirrors according to the invention.

FIG. 3 reveals the increase of the reflectivity and the widening of the spectral band of the mirror according to the invention. Curve 21 gives the reflectivity as a function of the wavelength of a conventional mirror formed from a metallic layer and a Bragg mirror centered on 652 nm.

Curves 22 and 24 correspond to a mirror according to the invention, where the silicon oxynitride (SiON) variable index layer has been respectively optimized for widening the spectral band towards the small and large wavelengths. It can be seen that the width of the band of the mirrors according to the invention, respectively 150 nm and 160 nm, is well above the spectral width of the band of the conventional mirror corresponding to curve 21 and which is 105 nm.

In addition, the silicon oxynitride layer of the mirror according to the invention makes it possible to significantly reduce the electrical field of the incident flux entering the Bragg mirror.

In order to express this field, it is broken down into a component Ep parallel to the incidence plane of the mirror and a component Es perpendicular to the incidence plane.

FIGS. 4 to 7 give perpendicular S and parallel P components of the electrical field as a function of the thickness z of the mirror described hereinbefore and for different wavelengths chosen in the spectral band of the mirror, where the reflectivity exceeds 99.7% (680, 625, 600 and 550 nm).

Figure 4:
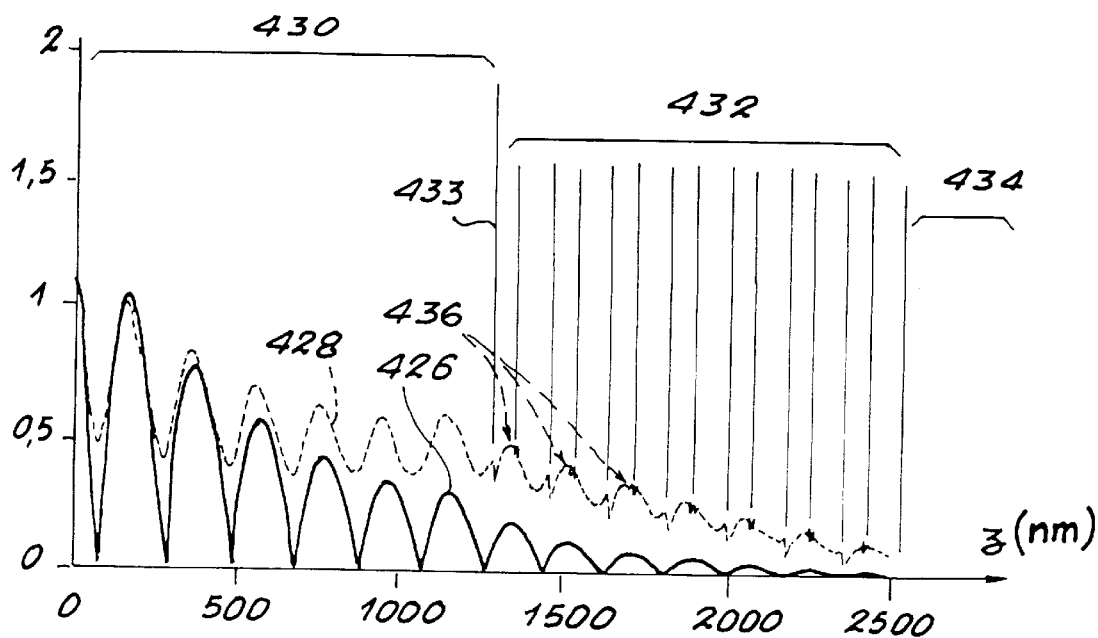
FIGS. 4 to 7 illustrate the parallel and perpendicular components of the electric field of an incident flux in the mirror according to the invention.

In FIG. 4, the components S and P of the field are respectively represented by curves 426 and 428. They correspond to an incident flux at 45° having a wavelength of approximately 680 nm.

FIG. 4 reveals a first region 430 corresponding to the variable index layer 6, a second region 432 corresponding to the Bragg mirror 4, where the dotted lines 433 indicate the layers 12, 14, and a third region 434 corresponding to the aluminum layer. In the region 432 it is possible to see discontinuities 436 corresponding to the interfaces between high and low refractive index layers.

Figure 5:
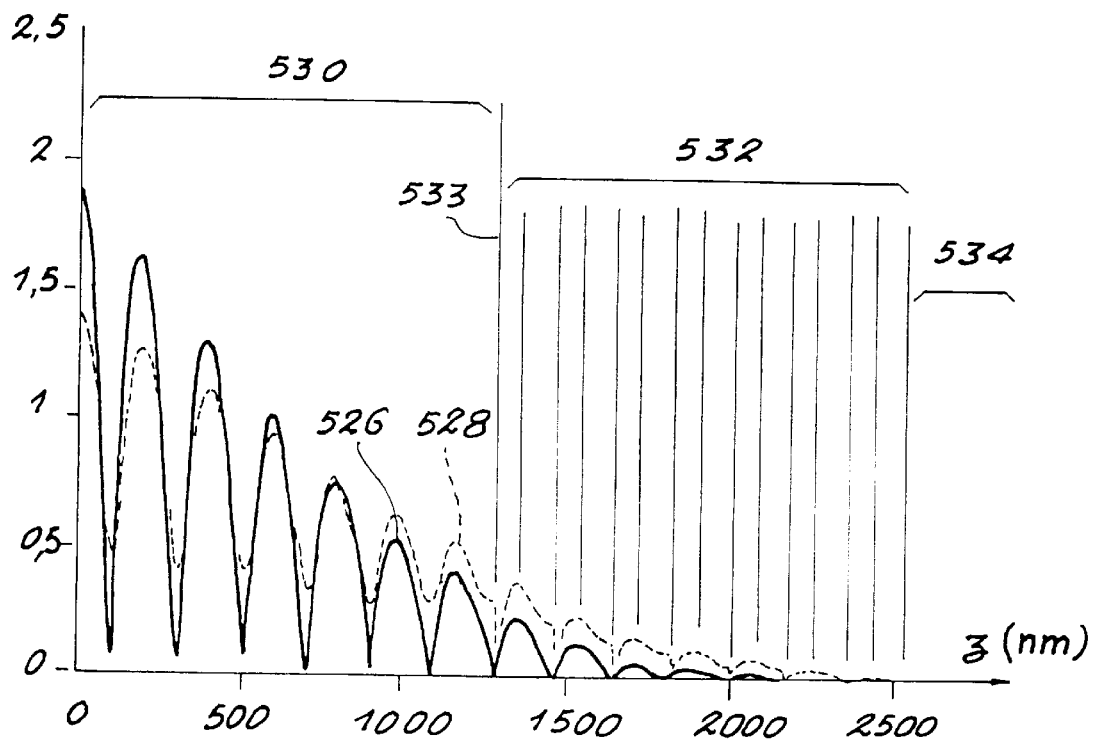
Figure 6:
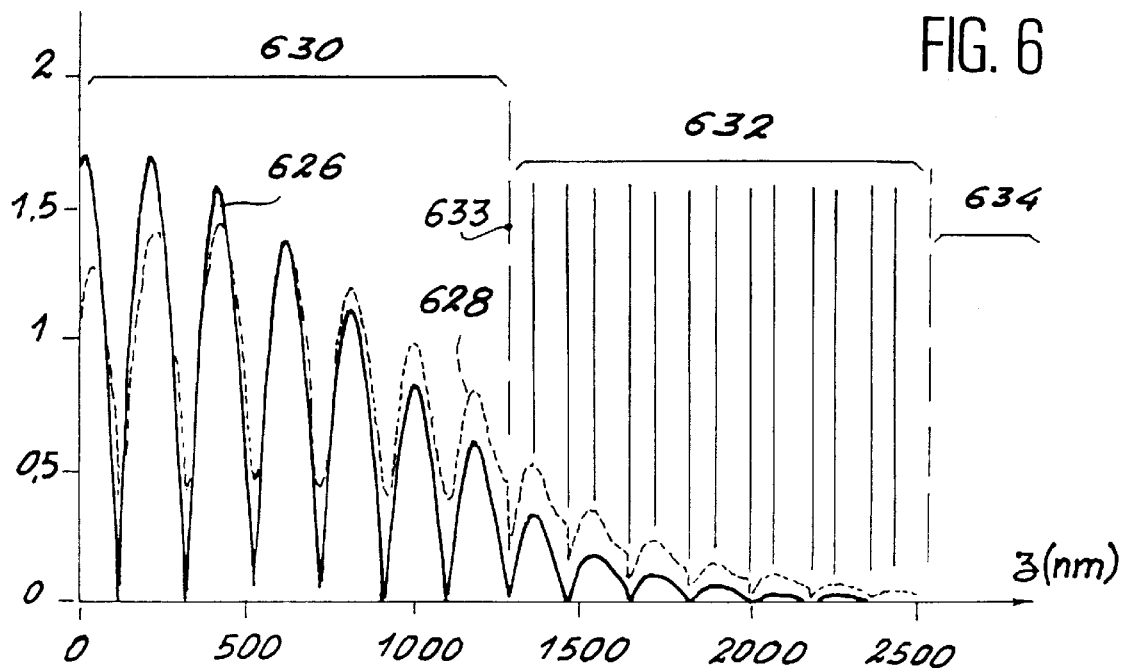
Figure 7:
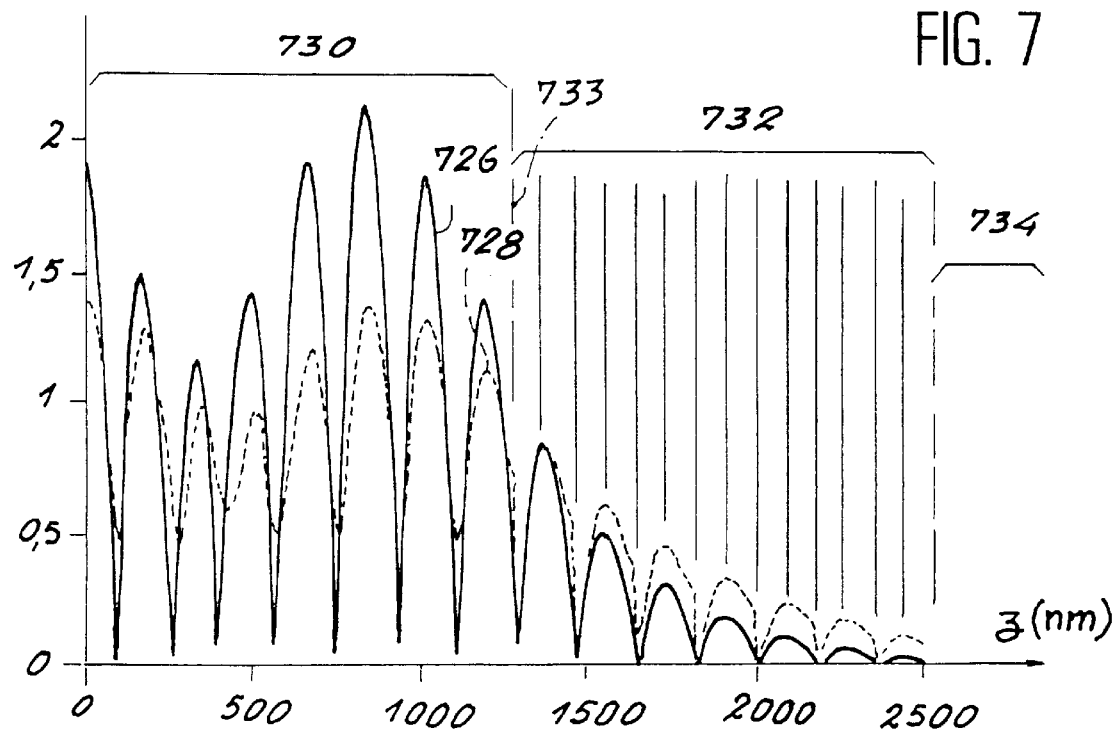

In FIGS. 5, 6 and 7, which still correspond to an incident flux at 45°, but for wavelengths of respectively 625, 600 and 550 nm, the elements corresponding to those of FIG. 4 carry the corresponding references, but whereof the hundreds figure indicates the drawing number.

In general terms, it can be seen in FIGS. 4 to 7 that as a result of the variable index layer for wavelengths relatively close to λo, the electrical field reaching the stack 4 is significantly attenuated compared with the electric field at the surface. Therefore the stack is protected against very intense fluxes.

DOCUMENTS REFERRED TO IN THE PRESENT TEXT (1) OPTICAL WAVES IN LAYERED MEDIA POSCHI YEH, publisher Willey Interscience
(2) Laser conditioning of optical thin films C. R. WOLFE & al. N.I.S.T. public Boulder damage symposium, CO USA 1989, pp 360–375
(3) THIN FILM OPTICAL FILTERS, H. A. MACLEOD, publisher Adam Hilger (second edition)
(4) SIMULATED ANNEALING: THEORY AND APPLICATIONS P.J.M. VAN LAARHOVEN I EHL AARTS Kluwer Academic publishers
(5) Evaluation and production of dielectric mirrors having a continuous and periodic index profile (in French), PHD thesis of the Joseph Fourier University, Grenoble 1, L. NOUVELOT, May 1993
(6) Production of $TiO_2$ and $SiO_2$ films by ion beam sputtering, C.N.A.M. Engineering Report, M IDA, 1990
(7) Conference of SOCIETY OF VACUUM COATERS, DALLAS, 1993. Reactive ion beam sputter deposition of graded interface optical thin films of aluminum oxynitride and silicon oxynitride, S. J. HOLMES & al. Northrop Corporation

We claim:

1. Process for producing a high reflectivity, broad band mirror, characterized in that it comprises the following stages:

a) deposition of a metallic layer on a substrate,
b) formation on the metallic layer of an alternating stack of layers of a first material and a second material respectively having a first refractive index and a second refractive index higher than the first refractive index,
c) formation on the stack of a layer of silicon oxynitride having a refractive index varying according to a continuous and periodic profile.

* * * * *